United States Patent [19]

Kroenke

[11] 4,234,473

[45] Nov. 18, 1980

[54] DODECYL-1,12-DIAMMONIUM DIMOLYBDATE AND COMPOSITION CONTAINING SAME

[75] Inventor: William J. Kroenke, Brecksville, Ohio

[73] Assignee: The B. F. Goodrich Company, Akron, Ohio

[21] Appl. No.: 62,444

[22] Filed: Jul. 30, 1979

[51] Int. Cl.$^3$ .............................................. C07F 11/00
[52] U.S. Cl. ............................ 260/45.75 R; 260/429 R
[58] Field of Search ..................... 260/429 R, 45.75 R

[56] References Cited

U.S. PATENT DOCUMENTS

| | | | |
|---|---|---|---|
| 2,909,541 | 10/1959 | Hugel | 260/429 R |
| 2,938,869 | 5/1960 | Hugel | 260/429 R X |
| 3,223,625 | 12/1965 | Cyphers et al. | 260/429 R X |
| 3,282,838 | 11/1966 | Knowles et al. | 252/49.7 |
| 3,290,245 | 12/1966 | Elliott et al. | 252/32.7 |
| 3,349,108 | 10/1967 | Marzluff | 260/429 R |
| 3,489,775 | 1/1970 | de Roch et al. | 260/348.5 |
| 4,053,455 | 10/1977 | Kroenke | 260/45.75 R |
| 4,153,792 | 5/1979 | Kroenke | 260/429 R |
| 4,164,473 | 8/1979 | Coupland et al. | 260/429 R |

Primary Examiner—Helen M. S. Sneed
Attorney, Agent, or Firm—James R. Lindsay

[57] ABSTRACT

Dodecyl-1,12-diammonium dimolybdate is disclosed as a novel amine molybdate and as a smoke retardant additive for vinyl chloride and vinylidene chloride polymer compositions.

4 Claims, No Drawings

DODECYL-1,12-DIAMMONIUM DIMOLYBDATE AND COMPOSITION CONTAINING SAME

BACKGROUND OF THE INVENTION

Amine molybdates may be produced by reacting an amine with a molybdenum compound such as molybdenum trioxide ($MoO_3$), molybdic acid or a molybdenum salt in an acidic aqueous medium made acidic through the addition of a suitable acid such as an organic acid containing 1 to 12 carbon atoms (exemplified by acetic acid, propionic acid, benzoic acid, and the like) or an inorganic acid (exemplified by hydrochloric acid, nitric acid or sulfuric acid). The acidic mixture is refluxed, preferably while being stirred continuously, until the reaction is complete, usually for about ¼ to 4 hours.

Amine molybdates also may be produced, as described in my co-pending application Ser. No. 016,583, filed Mar. 1, 1979 and entitled "Process For Making Amine Molybdates", by reacting essentially stoichiometric quantities for molybdenum trioxide with an amine in an aqueous medium essentially free of acid and in which a water-soluble ammonium or monovalent metal or divalent metal or trivalent rare earth metal salt of an inorganic or organic acid is dissolved.

The particular amine molybdate formed may depend upon which process is used to form the amine molybdate and the quantity of reactants present in the reaction mixture, as well as the reaction conditions.

SUMMARY OF THE INVENTION

The present invention pertains to a novel amine molybdate, namely, dodecyl-1,12-diammonium dimolybdate, which may be represented by the empirical formula $H_2(CH_2)_{12}(NH_2)_2Mo_2O_7$ and which exhibits major x-ray diffraction peaks at "d" spacings of 18.4Å, 9.03Å and 4.27Å. Like many other amine molybdates, dodecyl-1,12-diammonium dimolybdate functions as an effective smoke retardant additive for vinyl chloride and vinylidene chloride polymers.

DETAILED DESCRIPTION OF THE INVENTION

Dodecyl-1,12-diammonium dimolybdate may be produced by reacting ammonium dimolybdate [$(NH_4)_2Mo_2O_7$] and 1,12-diaminododecane in essentially a 2/1 molybdenum/1,12-diaminododecane molar ratio in an acidic aqueous medium. Suitable acids include inorganic acids such as hydrochloric acid, nitric acid, sulfuric acid, and the like, or mixtures thereof. The amount of acid used may be varied widely from about ½ to 10 or more molar equivalents of acid per molar equivalent of ammonium dimolybdate. However, about a 1/1 molar equivalent ratio is preferred. Sufficient water is included in the reaction mixture to insure a reaction medium that has a consistency that enables it to be easily stirred. Desirably, the ammonium dimolybdate is dissolved in water and is added to an acidic solution of the 1,12-diaminododecane. If preferred, the ammonium dimolybdate, 1,12-diaminododecane, acid and water can be charged essentially simultaneously to the reaction vessel. The reaction materials desirably are refluxed while being stirred continuously for 0.25 to 16 hours. Although the reaction can occur at room temperature (25° C.), desirably the reaction mixture is heated to between 75° to 110° C. in order to reduce the time for the reaction to be completed. After the reaction is completed, the white, crystalline dodecyl-1,12-diammonium dimolybdate formed can be separated from the liquid phase by filtration, centrifugation or other suitable separation means, washed with water, alcohol or a mixture of water and alcohol, and then dried. The reacted mixture may be cooled to room temperature (about 25° C.) before the separation of the solid dodecyl-1,12-diammonium dimolybdate from the liquid phase, although cooling the mixture before separation of the solid product from the liquid phase is not necessary. The recovered dodecyl-1,12-diammonium dimolybdate may be air dried, preferably at about 100° to 200° C., or may be vacuum dried, preferably at temperatures up to 150° C. and higher. The dodecyl-1,12diammonium dimolybdate is readily identifiable by elemental, infrared or x-ray diffraction analysis.

The following example illustrates the preparation of dodecyl-1,12-diammonium dimolybdate more fully:

EXAMPLE 1

5.00 grams of 1,12-diaminododecane, 4.92 grams of a 37 percent hydrochloric acid solution, 50 milliliters of ethanol and 50 milliliters of water were added to a round-bottom flask equipped with a water-cooled condenser and were broght to reflux. 8.49 grams of ammonium dimolybdate were added to 25 milliliters of water and the mixture was heated until the ammonium dimolybdate dissolved. The hot ammonium dimolybdate solution was added to the flask and the reaction mixture was refluxed while being stirred continuously for ½ hour. The contents of the flask were cooled to room temperature (about 25° C.) and were filtered. A white crystalline solid was recovered. The recovered solid was washed with a 50/50 volume mixture of ethanol and water and then with water. The washed solid was vacuum dried at 100° C. for approximately 16 hours. 12.30 grams of the crystalline solid was recovered. Elemental analysis of the crystalline solid showed its empirical formula to be $H_2(CH_2)_{12}(NH_2)_2Mo_2O_7$ and x-ray diffraction analysis revealed that the material exhibits major x-ray diffraction peaks at "d" spacings of 18.4Å, 9.03Å and 4.27Å. Infrared analysis supported the aforesaid empirical formula for the solid.

Dodecyl-1,12-diammonium dimolybdate has been found to be a smoke retardant additive for vinyl chloride and vinylidene chloride polymer compositions. When used as a smoke retardant additive, the dodecyl1,12-diammonium dimolybdate desirably has an average particle size from about 0.01 to about 800 microns, preferably from about 0.1 to about 100 microns, and is present in an amount from about 0.1 to about 20 parts by weight per 100 parts by weight of the vinyl chloride or vinylidene chloride polymer.

Vinyl chloride and vinylidene chloride polymers with which the dodecyl-1,12-diammonium dimolybdate can be used as a smoke retardant additive include homopolymers, copolymers and blends of homopolymers and/or copolymers. The vinyl chloride and vinylidene chloride polymers may contain from 0 to 50 percent by weight of at least one other olefinically unsaturated monomer. Suitable monomers include 1-olefins containing from 2 to 12 carbon atoms such as ethylene, propylene, 1-butene, isobutylene, 1-hexene, 4-methyl-1-pentene, and the like; dienes containing from 4 to 10 carbon atoms, including conjugaed dienes such as butadiene, isoprene, piperylene, and the like; ethylidene norbornene and dicyclopentadiene; vinyl esters and allyl esters such as vinyl acetate, vinyl chloroacetate, vinyl propionate, vinyl laurate, alkyl acetate, and the like; vinyl aromatics such as styrene, α-methyl styrene, chlorostyrene, vinyl toluene, vinyl naphthalene, and the like; vinyl and allyl ethers and ketones such as vinyl methyl ether, allyl methyl ether, vinyl isobutyl ether, vinyl n-butyl ether, vinyl chloroethyl ether, methylvinyl ketone, and the like; vinyl nitriles such as acrylonitrile, methacrylonitrile, and the like; cyanoalkyl acrylates such as α-cyanomethyl acrylate, the α-,β- and γ-cyanopropyl acrylate, and the like, olefinically unsaturated carboxylic acids and esters thereof, including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like; and including esters of maleic and fumaric acid, and the like; amides of the α-β-olefinically unsaturated carboxylic acids such as acrylamide, and the like, divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis (β-chloroethyl) vinyl phosphonate, and the like.

The vinyl chloride and vinylidene chloride polymer, in addition to the dodecyl-1,12-diammonium dimolybdate additive, may contain the usual compounding ingredients known to the art such as fillers, stabilizers, opacifiers, lubricants, processing aids, impact modifiers, plasticizers, antioxidants, and the like.

Smoke retardancy may be measured using an NBS Smoke Chamber according to procedures described in ASTM E662-79 "Test For Specific Optical Density of Smoke Generated By Solid Materials". Maximum smoke density ($D_m$) is a dimensionless number and has the advantage of representing a smoke density independent of chamber volume, specimen size or photometer path length, provided a consistent dimensional system is used. Percent smoke reduction is calculated using the equation:

$$\frac{Dm/g \text{ of control} - Dm/g \text{ of sample}}{Dm/g \text{ of control}} \times 100$$

The term "Dm/g" means maximum smoke density per gram of sample. Dm and other aspects of the physical optics of light transmission through smoke are discussed fully in the ASTM publication.

The smoke retardant property of dodecyl-1,12-diammonium dimolybdate is illustrated by the following examples.

| Examples 2-4 The following recipe was used: | |
|---|---|
| Material | Parts by Weight |
| Polyvinyl Chloride Resin* | 100.00 |
| Lubricant** | 2.0 |
| Tin Stabilizer*** | 2.0 |
| Dodecyl-1,12-diammonium dimolybdate | varied |

*Homopolymer of vinyl chloride having an inherent viscosity of about 0.98–1.04; ASTM classification GP-5-15443.
**A commercial polyethylene power lubricant (Microthene 510).
***Tin Thioglycolate.

The ingredients of the recipe were dry-mixed and bonded on a two-roll mill for about 5 minutes at a roll temperature of about 165° C. The milled compositions were pressed into a 6×6×0.025 inch sheets. Pressing was done at about 160° C. for 5 minutes using 40,000 pounds (about 14,900 Kg) of force applied to a 4-inch ram. The sample received a 2 minute preheat before being pressed.

The molded samples were cut into 2-7/8×2-7/8×0.50 inch sections. Testing was performed using the flaming mode of the NBS Smoke Chamber Test (ASTM E662-79) described heretofore. Test results are given in Table I.

TABLE I

| Example | Dodecyl-1,12-Diammonium Dimolybdate Parts By Weight | Dm/g* | Smoke Reduction % |
|---|---|---|---|
| 2 (control) | 0 | 68.40 | — |
| 4 | 2.0 | 55.86 | 19 |
| 5 | 5.0 | 41.70 | 39 |

*Dm/g = Maximum smoke density per gram of sample.

The improved smoke retardant vinyl chloride and vinylidene chloride polymer compositions obtained by the addition of dodecyl-1,12-diammonium dimolybdate to the compositions are useful wherever smoke resistance is desirable, such as in carpets, house siding, plastic components for airplane and passenger car interiors, and the like.

I claim:

1. Dodecyl-1,12-diammonium dimolybdate having the empirical formula $H_2(CH_2)_{12}(NH_2)_2Mo_2O_7$ and having major x-ray diffraction peaks at "d" spacings of 18.4Å, 9.03Å and 4.27Å.

2. A smoke retarded composition comprising a vinyl chloride or vinylidene chloride polymer together with a smoke retardant amount of dodecyl-1,12-diammonium dimolybdate having the empirical formula $$H_2(CH_2)_{12}(NH_2)_2Mo_2O_7$$

and having major x-ray diffraction peaks at "d" spacings of 18.4A, 9.03A, and 4.27A.

3. The smoke retarded composition of claim 2 wherein said amine molybdate has an average particle size from about 0.1 to about 100 microns.

4. The composition of claim 2 wherein said amine molybdate is present in an amount from 0.01 to about 20 parts by weight per 100 parts by weight of said polymer.

* * * * *